United States Patent [19]

Soltan

[11] Patent Number: 5,129,028
[45] Date of Patent: Jul. 7, 1992

[54] GRID FREE, MODULAR, LARGE SCREEN DISPLAY

[75] Inventor: Parviz Soltan, San Diego, Calif.

[73] Assignee: The United States of America as represented by the Secretary of the Navy, Washington, D.C.

[21] Appl. No.: 608,135

[22] Filed: Nov. 1, 1990

[51] Int. Cl.$^5$ .............................................. G02B 6/08
[52] U.S. Cl. ................................... 385/120; 385/115; 385/901
[58] Field of Search ............... 350/96.27, 96.13, 96.28, 350/96.24, 96.25, 96.26

[56] References Cited

U.S. PATENT DOCUMENTS

| | | | |
|---|---|---|---|
| 4,090,014 | 5/1978 | Vann et al. | 350/96.27 X |
| 4,299,447 | 11/1981 | Soltan et al. | 350/96.27 X |
| 4,533,215 | 8/1985 | Trias et al. | 350/347 E |
| 4,611,245 | 9/1986 | Trias | 358/231 |
| 4,623,219 | 11/1986 | Trias | 350/351 |
| 4,786,139 | 11/1988 | Sedlmayr | 350/96.27 |
| 4,983,015 | 1/1991 | Bourguignat et al. | 350/96.27 |

Primary Examiner—John D. Lee
Assistant Examiner—Phan T. Heartney
Attorney, Agent, or Firm—Harvey Fendelman; Thomas Glenn Keough

[57] ABSTRACT

An improvement for a large screen display eliminates the gap/grid line which is otherwise present between abutted display modules. Each of the display modules has a light-emanating/reflecting display surface which provides a visual indication of the information content on a problem of a visual display for the large screen. A diverging strip is superimposed over each gap/grid line and at least a portion of the butting light-radiating display surfaces so that light is diverged from the abutted light-radiating surfaces to optically mask the gap/grid line and present a continuous uniterrupted display across the surface of the large screen display. The diverging strip can be tilted hollow fiber microchannels, tilted optical fibers or tilted plastic fibers inclined or fan-shaped at about a 10°-15° angle so that the gap/grip lines are optically masked. Optionally, a diverger panel as big as the display module is superimposed over each module extending over the gap/grid line for diverging the light projected from the abutted light radiating panels, thereby optically masking each gap/grid line. A linear face plate is mounted on the strip to improve the viewing angle.

32 Claims, 3 Drawing Sheets

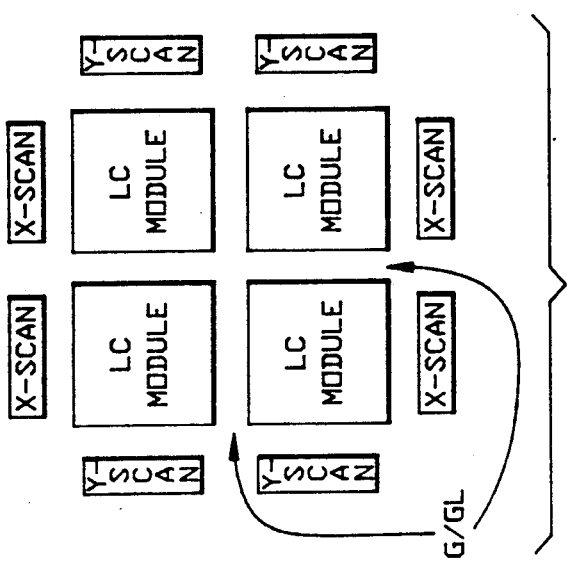
FIG. 1A (PRIOR ART)
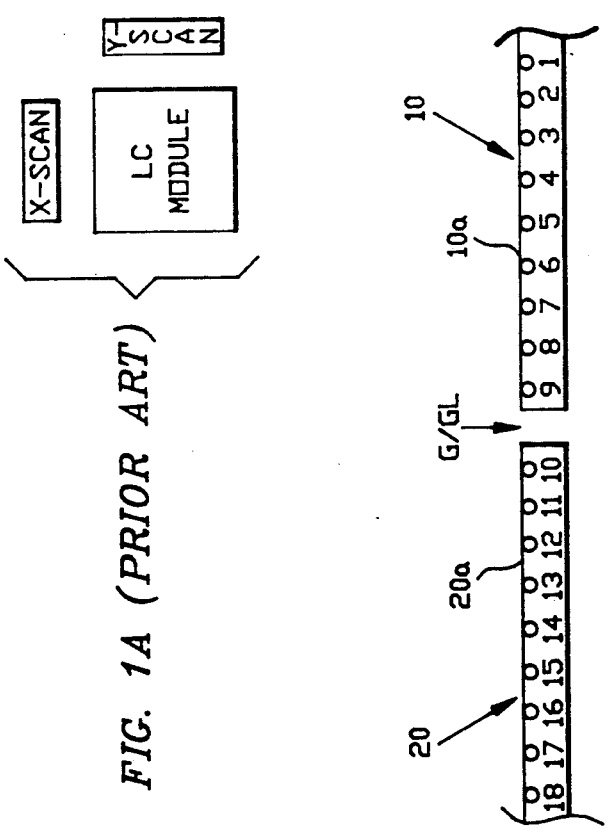
FIG. 1B (PRIOR ART)
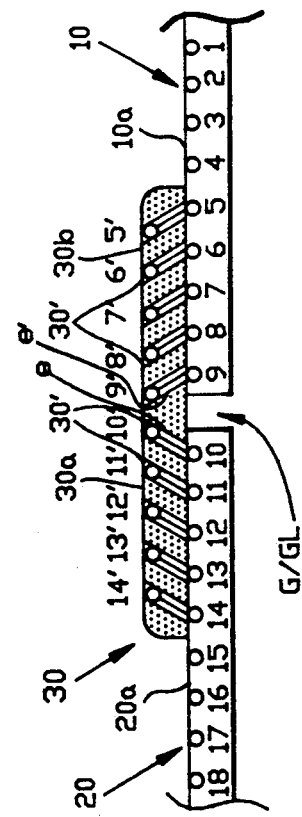
FIG. 2A
FIG. 2B

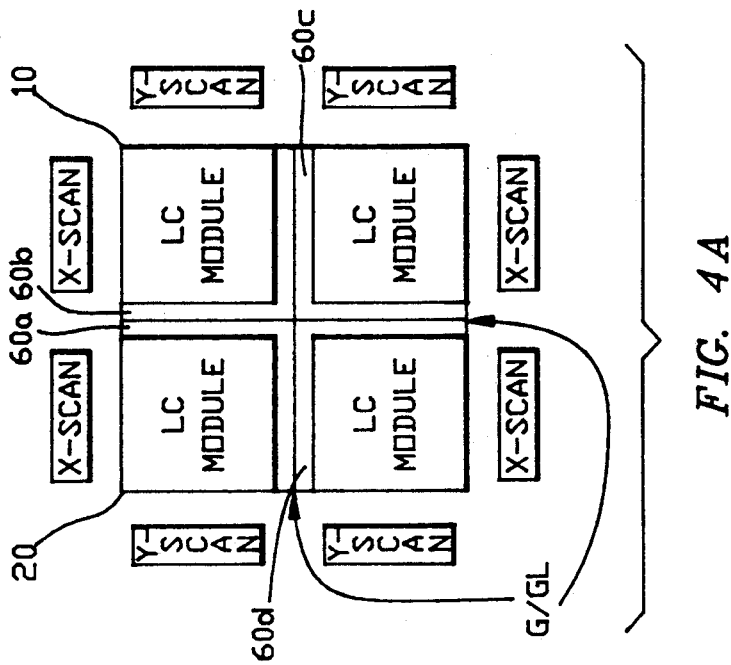
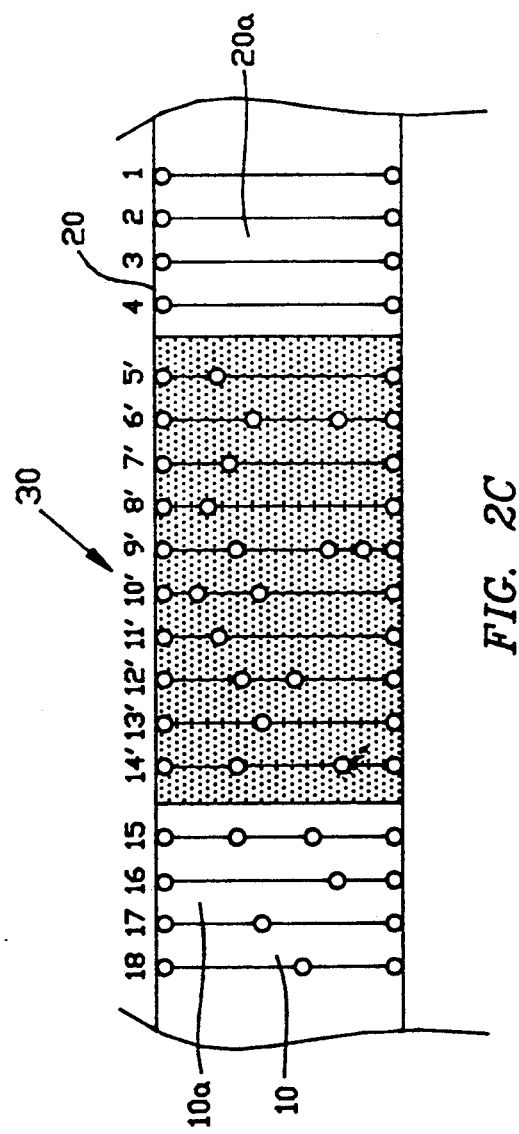
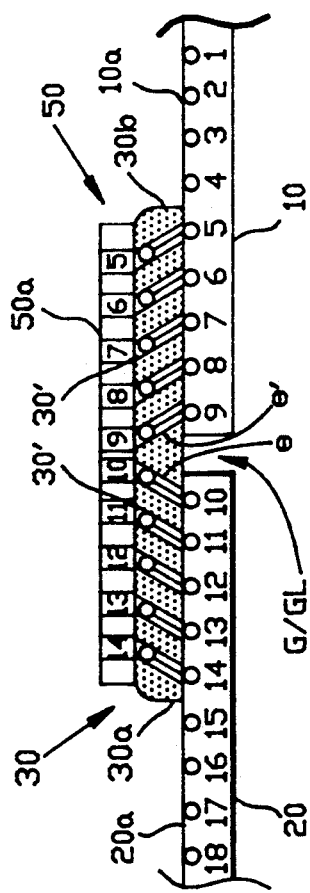

GRID FREE, MODULAR, LARGE SCREEN DISPLAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Large screen displays have proven their worth for presenting information in an effective manner to groups of people or where the data content is such that its effectiveness is best appreciated by having a large amount of associated data available for viewing at the same time. The large screen displays can make useful information portrayals in a real-time scenario to educate and permit concerted, effective results.

Motion pictures and opaque projectors have demonstrated the validity of large screen displays and have allowed groups to gather in auditoriums and the like although the time taken for the development of films and opaque projector slides tends to compromise real-time viewing. Motion picture or opaque projectors are not suitable where real-time viewing or the available space restricts their use.

As a consequence, increased interest is shown in flat display technology which typically relies on a high resolution liquid crystal (LC) display panel with its associated thin film transistor (TFT), charge couple device (CCD) or laser addressing techniques.

The TFT-LCD is a known display element and is described in the article by Thomas L. Credelle entitled "GEs, LCs, TFT Panel" appearing in *Public Information For A. M. Release. W.*, 7 Oct. 1987, From G. E. Research and Development Center, Schenectady, N. Y., #RDC 25,865-5-0.

Typically, a single LC display module forms an image in a liquid crystal layer sandwiched between a silicon integrated TFT circuit and a glass face plate. The TFT integrated circuit addresses the appropriate elements in the liquid crystal layer and a glass face plate couples the resulting image to a diffuser plane for viewing. Such is the arrangement shown in the "Liquid Crystal Fiber Optic Large Screen Display Panel" of Parviz Soltan et al. U.S. Pat. No. 4,299,447. The modulator unit changes its transmissivity in accordance with the appropriate signals so that a high intensity light emanating from a light source is channeled through the unit for an appropriate display.

Laser addressing of liquid crystal panels for a reflective large screen display is shown in a series of patents to John Trias et al. in his U.S. Pat. Nos. 4,533,215, 4,611,245 and 4,623,219. A single liquid crystal is depicted.

Costs and the complexity of merely making a larger single module can be prohibitive. There is a practical size limitation in the fabrication of a larger single module due to the inherent complexities of such an undertaking. Thousands of components are required in a TFT orientated module by only adding one inch in size, e. g. from a 8"×8" module to a 9"×9" module requires millions of dollars of capitol equipment investment plus the engineering complexities of solving shorts, component failure and associated malfunctions for the added size.

Because of the inherent complexities of fabrication associated with large LC/TFT display panels, their display capability is size limited to display modules which are relatively small. The size limitation for a large screen display might be overcome by abutting a number of these display modules in a mosaic pattern; however, a distracting, gap/grid line phenomenon is created. It is conceivable, by having the teachings of this invention in mind, that several of the above referred to display modules could have been used in a mosaic arrangement for an appropriate display, be it for direct reading or for viewing in a reflective mode of display.

The gap/grid line limitation is graphically portrayed in FIG. 1A in which a single LC/TFT display module with its X and Y scanners and drivers, is replicated and tiled together, as depicted in FIG. 1B. This mosaic approach creates unwanted gap/grid lines (G/GL) between the abutting LC modules which, at least, prove to be distracting to viewers.

Thus, a continuing need exists in the state of the art for a means for optically masking the unwanted gap/grid lines created between abutted adjacent display modules in a mosaic arrangement of display modules.

SUMMARY OF THE INVENTION

The present invention is directed to providing an improved large screen display. A plurality of display modules, each having light-emanating display surfaces for projecting light therefrom, are tiled together to produce gap/grid lines between abutted light radiating display surfaces. A diverger strip is superimposed over each gap/grid line and at least a portion of the abutted light radiating display surfaces for diverging at least a portion of the light projected from the abutted light radiating panels, thereby optically masking each gap/grid line. Optionally, a diverger panel as big as the display module is superimposed over each module extending over the gap/grid line for diverging the light projected from the abutted light radiating panels, thereby optically masking each gap/grid line.

An object of the invention is to provide an improved large screen display providing size, flexibility and suitability for a desired viewing need without introducing viewer distractions.

An object of the invention is to provide an improved large screen display that avoids the showing of gap/grid lines between adjacent display modules.

Another object is to provide a tiled arrangement of display modules with appropriate diverger strips or diverger panels for optically masking gap/grid lines that otherwise might appear between adjacent display modules.

An object of the invention is to optically mask the gap/grid lines appearing between adjacent display modules.

Another object is to provide a diverger strip superimposed over at least part of abutted light radiating display surfaces of discrete display modules to eliminate the gap/grid line therebetween.

Another object is to provide a diverger panel superimposed over each light radiating display surface of each abutted discrete display module to eliminate the gap/grid line therebetween.

Another object is to provide a diverger strip superimposed over at least part of abutted light radiating display surfaces made up of hollow optical glass fibers (microchannel) to eliminate the gap/grid line therebetween.

Another object is to provide a diverger strip superimposed over at least part of abutted light radiating display surfaces made up of plastic fibers to eliminate the gap/grid line therebetween.

Another object is to provide a diverger panel (module sized sheet) superimposed over each abutted light radiating display surface made up of plastic fibers to eliminate the gap/grid line therebetween.

Another object is to provide portion of an optional fan-like configuration structure for the diverger strip or diverger panel depicting for optically masking gap/grid lines that otherwise might appear between adjacent display modules with the addition of a linear top layer for improving the viewing angle.

These and other objects of the invention will become more readily apparent from the ensuing specifications and drawings when taken in conjunction with the appended claims.

BRIEF DESCRIPTION OF THE DRAWINGS

FIGS. 1A and 1B respectively show a single LC/TFT module and a mosaic configuration of LC/TFT modules that create interposed gap/grid lines (G/GL).

FIGS. 2A, 2B and 2C show a cross-sectional side view of abutted liquid crystal/TFT modules without a superimposed diverger strip mounted thereon, a cross-sectional side view of abutted liquid crystal/TFT modules with a superimposed diverger strip mounted thereon optically masking a gap/grid line therebetween and a top view of abutted liquid crystal/TFT modules with a superimposed diverger strip mounted thereon optically masking a gap/grid line therebetween, respectively.

FIG. 3 is a side view of the liquid crystal/TFT modules with the superimposed diverger strip of FIG. 2B, with the addition of a linear top layer for improving the viewing angle.

FIGS. 4A, and 4B show a top view of four abutted liquid crystal/TFT modules with four superimposed diverger panels mounted thereon and a cross-sectional side view of two abutted liquid crystal/TFT modules with two superimposed diverger panels mounted thereon optically masking a gap/grid line therebetween, respectively.

DESCRIPTION OF THE PREFERRED EMBODIMENT

Figure 4B:
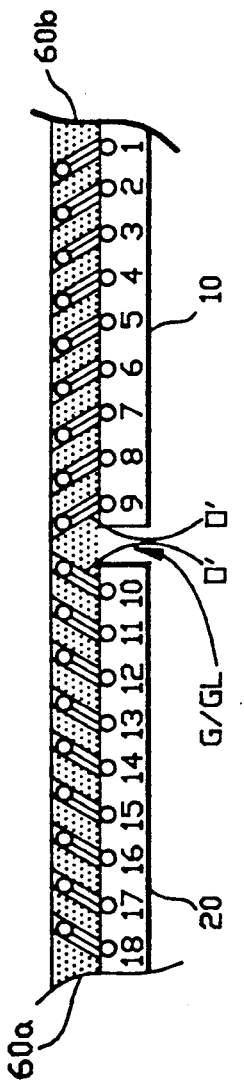

Referring once again to FIG. 1A of the drawings, a limitation of the prior art became apparent when an LC/TFT display module was replicated to make a large screen display. When the replicated modules were abutted together in a mosaic arrangement as shown in FIG. 1B, gap/grid lines (G/GL) were created between the abutted adjacent modules. The G/GL between two abutting LC/TFT modules is usually about 10 to 12 mm. and is an observable discontinuity that detracts a viewer's attention from the subject matter being displayed as well as tending to compromise clarity and resolution. The need for removing these discontinuities is apparent.

A main approach to optically overcome this gap is to either enlarge the display pictures and elevate them by taper fibers, see Soltan et al U.S. Pat. No 4,299,447, or use thin layers of microchannel plating to shift the display pictures above the gap to optically mask this about 10 mm. between-module gap, such as by this inventive concept.

Looking now to FIG. 2A, a pair of abutting liquid crystal modules 10 and 20 are shown with each having light emanating/reflecting surfaces 10a or 20a. The designation, light emanating/reflecting surfaces is intended to include the light radiating or transmissive mode of operation as referred to in the above identified Soltan et al patent and the light reflecting or reflective mode of operation as referred to in the above identified Trias patents. This inventive concept functions effectively to optically mask G/GL in these modes of operation as well as other modes not herein specifically discussed as will be apparent to one versed in the relevant arts.

The abutting liquid crystal modules might be part of the tiled mosaic arrangement of four modules of FIG 1B or a larger tiled array of many such modules with light emanating/reflecting surfaces suitably designed to relocate the X-scanners and y-scanners, possibly behind the modules, for example. After the abutting liquid crystal modules are arranged in their tiled configuration, their abutting contiguous edges define an interposed G/GL.

The G/GL of FIG. 2A is depicted in exaggerated form for the purposes of demonstration. The information displayed by pixel lines 1-9 in module 10 and the pixel lines 10-18 in module 20 is interrupted and distorted by the G/GL.

In FIG. 2B and in FIG. 2C a diverger strip 30 is superimposed across the G/GL of about 10 mm. and at least one pixel line in each of the abutting modules to optically mask the G/GL from a viewer, although 5 pixel lines are shown to be superimposed on each of the abutting modules in this example. The superimposed diverging strip is depicted as redirecting the light that is emanated or reflected from the pixel lines 5 through 9 and 10 through 14 of light radiating display surfaces 10a and 20a of display modules 10 and 20, respectively. In this manner the interruption or discontinuity along the G/GL is optically masked.

Each diverging strip 30 contains a multitude of hollow glass optical fibers 30' that can be fabricated from a plurality of hollow fiber optic microchannel plates arranged in one portion 30a of diverging strip 30 that are tilted at an angle $\theta$ and a plurality of hollow fiber optic microchannel plates arranged in another portion 30b of diverging strip 30 that are tilted at an angle $\theta'$, as shown in FIG. 2B. The hollow fiber microchannel plates have a number of juxtaposed hollow optical fibers 30' in a variety of thicknesses and spacings to accommodate the spacing of the pixel lines at the light emanating/reflecting surfaces of the abutting display modules. Two such microchannel plates having 18 mm and 25 mm thicknesses are marketed by Varian/Image Tube Division, 601 California Avenue, Palo Alto, Calif. 94303-0883, under the catalog number designations DUW-8960 and DUW-8946, respectively.

The microchannel plates are laminated together and tilted in optical axis at an angle $\theta$ and at an angle $\theta'$, as shown of about 10°-15°. The plates are positioned to align with hollow optical fibers with at least one pixel line on opposite sides of G/GL to optically mask the G/GL (although the superimposed strip of FIGS. 2A, 2B and 2C show four aligned pixel lines in portions 30a and 30b).

In other words, the hollow fibers in pixel lines 10'-14' in portion 30a of diverger strip 30 are aligned to coincide with the spatial disposition of pixel lines 10-14 of display module 12 and are each parallel one with the other and oriented with a tilt angle $\theta$. The hollow fibers in the microchannel plates of fibers 5'-9' in portion 30b of diverger plate 30 are appropriately arranged to be aligned and coincide with the pixel lines 5-9 in display module 10 and oriented in a parallel relationship with each other to be tilted at an angle $\theta'$. The composite effect of the tilted hollow fibers in portions 30a and 30b is to optically mask a G/GL between the abutting display modules 10 and 20. This overcomes the G/GL problems resulting from the mosaic arrangement of a considerable number of display modules if such a number are needed for a particular display purpose.

Conventional optical fibers in a parallel, bunched arrangement or incorporated in plates may be selected and appropriately tilted instead of hollow fibers. Properly tilted hollow or solid plastic conduits and the like in parallel bunches or plates also may be desirable instead of hollow fibers for some uses.

The tiling of a number of display modules which have superimposed strips 30 eliminate the number of G/GLs that might otherwise distract an observer. The microchannel plates in each of the diverger strips which are superimposed over the G/GLs and portions of the abutting display modules have appropriately tilted hollow fibers in each of these portions. The hollow fibers in each of the portions are tilted at a 10°-15° angle of $\theta$ and $\theta'$ (or may be a fan-shaped configuration) to divert the module light to optically mask the G/GLs and produce an improved large screen display. This uncomplicated tiling and optical masking procedure is at a greatly reduced fabrication cost as compared to some conventional approaches.

Looking to FIG. 3, the side view of a pair of display modules 10 and 20 with light radiating (emanating/reflecting) display surfaces 10a and 20a after installation of a diverger strip 30 is further improved by the inclusion of a linear face plate 50. The linear face plate improves the viewing angle and includes a multitude of parallel hollow or conventional optical fibers, plastic light transmitting members or a similar optical information transmission structure that reorients and presents the image appearing on at least the outside of diverger strip 30 along an outer surface 50a. Optionally, linear face plate 50 may be made to extend to cover some or all of light radiating display surfaces 10a and 20a if desired in a large screen display application.

FIG. 4A shows a four module mosaic with each module being superimposed by a separate thin diverger panel 60a, 60b, 60c and 60d that each abut one another and which each cover the entire surface of its superimposed module. Each thin diverger panel has its light conduits (hollow or conventional, glass or plastic optical fibers arranged in bunches or in plates) tilted in an origin-orientated tilt angle O' that accommodates the orthogonal G/GL intersections, see FIG. 4B. It is to be understood that angles O' as shown in FIG. 4B with respect to thin diverger panel 60a, and 60b, are substantially the same as discussed above. However, tilt angles O' of the diverger panels not only tilt toward adjacent, abutting modules but also are inclined to tilt the light conduits of each of the diverger panels of opposite quadrants toward one another, e. g. light conduits in modules 60a and 60c tilt toward each other and light conduits in modules 60b and 60d tilt toward each other (toward the intersection of the four abutted modules) to avoid the G/GL discontinuities.

Figure 5:
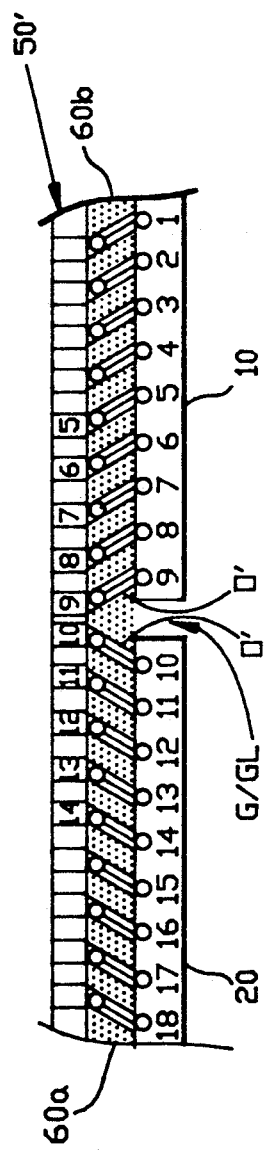
FIG. 5 is a side view of the liquid crystal/TFT modules with the superimposed diverger panel of FIG. 4B, with the addition of a linear top layer for improving the viewing angle.

Furthermore, the arrangement of FIGS. 4A and 4B may be provided with a linear face plate 50' to improve the viewing angle, see FIG. 5. The linear face plate is appropriately orientated in accordance with sound optical design criteria to align with pixels and avoid distortion.

Figure 6:
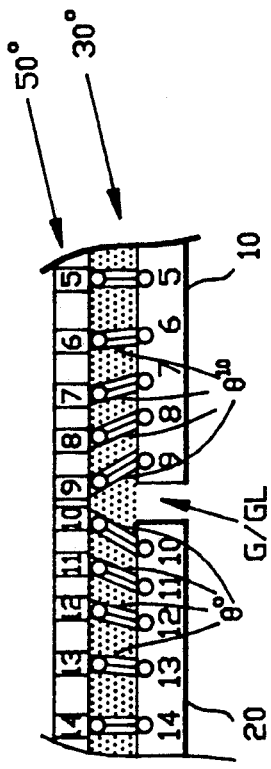
FIG. 6 is a side view of a portion of a diverger strip or diverger panel depicting the optional fan-like configuration structure for optically masking gap/grid lines that otherwise might appear between adjacent display modules with the addition of a linear top layer for improving the viewing angle.

Optionally, noting FIG. 6, tilt angle $\theta°$ or $\theta'°$ of the hollow glass optical fibers, solid glass optical fibers, or plastic fibers need not be all the same to optically mask the G/GL, but could have a fan-shaped cross-sectional configuration in a panel 30° that is appropriately aligned with the pixel lines. A variable, tilted light conduit effect could be created by individual tilt angles for the light conduits in panel 30° that are adjusted appropriately to assume a generally fan-shape to cover the G/GL. A linear face plate 50° also may be included with the portion of panel 30° shown and it may extend across the entire panel as well as the other panels to improve the viewing angle.

The plates or bundles of hollow glass optical fibers, solid glass optical fibers, or plastic fibers of the diverger strips or the diverger panels also may be appropriately tapered to have an increasing dimension as they extend from the light radiating display surfaces of the display modules. This will present an image magnification while, at the same time, they are appropriately tilted to optically mask the G/GL. This tapering of the light conduits is in accordance with the capabilities of the art, see, for example, the above referenced Soltan et al. patent.

Obviously, many modifications and variations of the present invention are possible in the light of the above teachings. It is therefore to be understood that within the scope of the appended claims, the invention may be practiced otherwise than as specifically described.

I claim:
1. An improved large screen display comprising:
   a plurality of display modules having light emanating/reflecting display surfaces for projecting light therefrom, being tiled together with abutted said light emanating/reflecting display surfaces producing a gap/grid line between said abutted said light emanating/reflecting display surfaces and;
   means superimposed over each said gap/grid line and at least a portion of said abutted said light emanating/reflecting display surfaces for diverging at least a portion of said light projected from at least one abutted light emanating/reflecting surface thereby optically masking each said gap/grid line, the diverging means is at least one tilted microchannel strip of hollow fibers, in which each tilted hollow fiber microchannel strip includes a first portion said superimposed on said at least said portion of one of said light emanating/reflecting display surfaces with its hollow fibers tilted toward said gap/grid line and a second portion said superimposed on said at least said portion of another abutted one of said light emanating/reflecting display surfaces with its hollow fibers tilted toward said gap/grid line and said first portion.

2. An improved large screen display according to claim 1 in which said hollow fibers of said first portion and said second portion of said tilted hollow fiber microchannel strip are tilted toward one another at an angle of between 10° and 15°.

3. An improved large screen display according to claim 2 in which said hollow fibers of said first portion and said second portion of said tilted hollow fiber microchannel strip are tilted toward one another at a parallel angle of between 10° and 15°.

4. An improved large screen display according to claim 1 in which said hollow fibers of said first portion and said second portion of said tilted hollow fiber microchannel strip are tilted toward one another at a varying fan-shaped angle of between 10° and 15°.

5. An improved large screen display according to claim 1, 2, 3, or 4, further including:
a linear face plate mounted on at least the diverging means to improve the viewing angle.

6. An improved large screen display according to claim 5 in which said linear face plate includes an optical information transmission structure of a multitude of parallel hollow optical fibers that reorients and presents an image.

7. An improved large screen display according to claim 5 in which said diverging means is tapered to effect an image magnification.

8. An improved large screen display according to claim 5 in which said linear face plate includes an optical information transmission structure of a multitude of parallel conventional optical fibers, that reorients and presents an image.

9. An improved large screen display according to claim 5 in which said linear face plate includes an optical information transmission structure of a multitude of plastic light transmitting members, that reorients and presents an image.

10. An improved large screen display comprising:
a plurality of display modules having light emanating/reflecting display surfaces for projecting light therefrom, being tiled together with abutted said light emanating/reflecting display surfaces producing a gap/grid line between said abutted said light emanating/reflecting display surface and;
means superimposed over each said gap/grid line and at least a portion of said abutted said light emanating/reflecting display surfaces for diverging at least a portion of said light projected from at least one abutted light emanating/reflecting surface thereby optically masking each said gap/grid line, the diverging means is at least one tilted microchannel strip of solid optical fibers, in which each tilted solid optical fiber microchannel strip includes a first portion said superimposed on said at least said portion of one of said light emanating/reflecting display surfaces with its solid optical fibers tilted toward said gap/grid line and a second portion said superimposed on said at least said portion of another abutted one of said light emanating/reflecting display surfaces with its solid optical fibers tilted toward said gap/grid line and said first portion.

11. An improved large screen display comprising:
a plurality of display modules having light emanating/reflecting display surfaces for projecting light therefrom, being tiled together with abutted said light emanating/reflecting display surfaces producing a gap/grid line between said abutted said light emanating/reflecting display surfaces and;
means superimposed over each said gap/grid line and at least a portion of said abutted said light emanating/reflecting display surfaces for diverging at least a portion of said light projected from at least one abutted light emanating/reflecting surface thereby optically masking each said gap/grid line, the diverging means is at least one tilted microchannel strip of solid plastic fibers, in which each tilted solid plastic fiber microchannel strip includes a first portion said superimposed on said at least said portion of one of said light emanating/reflecting display surfaces with its solid plastic fibers tilted towards said gap/grid line and a second portion said superimposed on said at least said portion of another abutted one of said light emanating/reflecting display surfaces with its solid plastic fibers tilted toward said gap/grid line and said first portion.

12. An improved large screen display comprising:
a plurality of display modules having light emanating/reflecting display surfaces for projecting light therefrom, being tiled together with abutted said light emanating/reflecting display surfaces producing a gap/grid line between said abutted said light emanating/reflecting display surfaces and;
means superimposed over each said gap/grid line and at least a portion of said abutted said light emanating/reflecting display surfaces for diverging at least a portion of said light projected from at least one abutted light emanating/reflecting surface thereby optically masking each said gap/grid line, the diverging means is at least one tilted microchannel strip of hollow plastic fibers, in which each tilted hollow plastic fiber microchannel strip includes a first portion said superimposed on said at least said portion of one of said light emanating/reflecting display surfaces with its hollow plastic fibers tilted toward said gap/grid line and a second portion said superimposed on said at least said portion of another abutted one of said light emanating/reflecting display surfaces with its hollow plastic fibers tilted toward said gap/grid line and said first portion.

13. An improved large screen display according to claim 10, 11 or 12 further including:
a linear face plate mounted on at least the diverging means to improve the viewing angle.

14. An improved large screen display according to claim 13 in which said linear face plate includes an optical information transmission structure of a multitude of parallel hollow optical fibers that reorients and presents an image.

15. An improved large screen display according to claim 13 in which said linear face plate includes an optical information transmission structure of a multitude of parallel conventional optical fibers that reorients and presents an image.

16. An improved large screen display according to claim 13 in which said linear face plate includes an optical information transmission structure of a multitude of plastic light transmitting members that reorients and presents an image.

17. An improved large screen display according to claim 13 in which said diverging means is tapered to effect an image magnification.

18. An improved large screen display comprising:

a plurality of display modules having light emanating/reflecting display surfaces for projecting light therefrom, being tiled together with abutted said light emanating/reflecting display surfaces producing a gap/grid line between said abutted said light emanating/reflecting display surfaces and;

a diverger panel superimposed over each of said abutted said light emanating/reflecting display surfaces for diverging said light projected from said abutted said light emanating/reflecting surface thereby optically masking each said gap/grid line, each said diverger panel includes tilted microchannel strips of hollow fibers tilted toward intersecting gap/grid lines, in which said hollow fibers of each said diverger panel of opposite quadrants are tilted toward one another at an appropriate angle to optically mask said grid/gap line, such as, of between 10° and 15°.

19. An improved large screen display comprising:

a plurality of display modules having light emanating/reflecting display surfaces for projecting light therefrom, being tiled together with abutted said light emanating/reflecting display surfaces producing a gap/grid line between said abutted said light emanating/reflecting display surfaces and;

a diverger panel superimposed over each of said abutted said light emanating/reflecting display surfaces for diverging said light projected from said abutted said light emanating/reflecting surface thereby optically masking each said gap/grid line, each said diverger panel includes tilted microchannel strips of hollow fibers tilted toward intersecting gap/grid lines, in which said hollow fibers of each said diverger panel of opposite quadrants are tilted toward one another at an appropriate angle to optically mask said grid/gap line, such as, at a parallel angle of between 10° and 15°.

20. An improved large screen display comprising:

a plurality of display modules having light emanating/reflecting display surfaces for projecting light therefrom, being tiled together with abutted said light emanating/reflecting display surfaces producing a gap/grid line between said abutted said light emanating/reflecting display surfaces and;

a diverger panel superimposed over each of said abutted said light emanating/reflecting display surfaces for diverging said light projected from said abutted said light emanating/reflecting surface thereby optically masking each said gap/grid line, each said diverger panel includes tilted microchannel strips of hollow fibers tilted toward intersecting gap/grid lines, in which said hollow fibers of each said diverger panel of opposite quadrants are tilted toward one another at an appropriate angle to optically mask said grid/gap line, such as, at a varying fan-shaped angle of between 10° and 15°.

21. An improved large screen display according to claim 18, 19, or 20 further including:

a linear face plate mounted on at least the diverging means to improve the viewing angle.

22. An improved large screen display according to claim 21 in which the linear face plate includes an optical information transmission structure of a multitude of parallel hollow optical fibers that reorients and presents the image.

23. An improved large screen display according to claim 21 in which said diverging means is tapered to effect an image magnification.

24. An improve large screen display according to claim 21 in which the linear face plate includes an optical information transmission structure of a multitude of parallel conventional optical fibers that reorients and presents the image.

25. An improve large screen display according to claim 21 in which the linear face plate includes an optical information transmission structure of a multitude of plastic light transmitting members that reorients and presents the image.

26. An improved large screen display comprising:

a plurality of display modules having light emanating/reflecting display surfaces for projecting light therefrom, being tiled together with abutted said light emanating/reflecting display surfaces producing a gap/grid line between said abutted said light emanating/reflecting display surfaces and;

a diverger panel superimposed over each of said abutted said light emanating/reflecting display surfaces for diverging said light projected from said abutted said light emanating/reflecting surface thereby optically masking each said gap/grid line, each said diverger panel includes tilted microchannel strips of solid optical fibers tilted toward intersecting gap/grid lines.

27. An improved large screen display comprising:

a plurality of display modules having light emanating/reflecting display surfaces for projecting light therefrom, being tiled together with abutted said light emanating/reflecting display surfaces producing a gap/grid line between said abutted said light emanating/reflecting display surfaces and;

a diverger panel superimposed over each of said abutted said light emanating/reflecting display surfaces for diverging said light projected from said abutted said light emanating/reflecting surface thereby optically masking each said gap/grid line, each said diverger panel includes tilted microchannel strips of solid plastic fibers tilted toward intersecting gap/grid lines.

28. An improved large screen display comprising:

a plurality of display modules having light emanating/reflecting display surfaces for projecting light therefrom, being tiled together with abutted said light emanating/reflecting display surfaces producing a gap/grid line between said abutted said light emanating/reflecting display surfaces and;

a diverger panel superimposed over each of said abutted said light emanating/reflecting display surfaces for diverging said light projected from said abutted said light emanating/reflecting surface thereby optically masking each said gap/grid line, each said diverger panel includes tilted microchannel strips of hollow plastic fibers tilted toward intersecting gap/grid lines.

29. An improved large screen display according to claim 26, 27 or 28 further including:

a linear face plate mounted on at least the diverging means to improve the viewing angle.

30. An improved large screen display according to claim 29 in which the linear face plate includes an optical information transmission structure of a multitude of parallel hollow optical fibers that reorients and presents the image.

31. An improved large screen display according to claim 29 in which the linear face plate includes an optical information transmission structure of a multitude of parallel conventional optical fibers that reorients and presents the image.

32. An improved large screen display according to claim 29 in which the linear face plate includes an optical information transmission structure of a multitude of plastic light transmitting members that reorients and presents the image.

* * * * *